United States Patent
Dove (10) Patent No.: US 9,961,842 B2
(45) Date of Patent: May 8, 2018

(54) TREE SAW ATTACHMENT FOR SMALL VEHICLE

(71) Applicant: Bill Dove, Green Ridge, MO (US)

(72) Inventor: Bill Dove, Green Ridge, MO (US)

( * ) Notice: Subject to any disclaimer, the term of this patent is extended or adjusted under 35 U.S.C. 154(b) by 609 days.

(21) Appl. No.: 14/573,127

(22) Filed: Dec. 17, 2014

(65) Prior Publication Data

US 2015/0173311 A1    Jun. 25, 2015

Related U.S. Application Data (60) Provisional application No. 61/919,222, filed on Dec. 20, 2013, provisional application No. 62/016,870, filed on Jun. 25, 2014.

(51) Int. Cl.
*A01G 23/091* (2006.01)

(52) U.S. Cl.
CPC ............. *A01G 23/091* (2013.01); *Y10T 83/04* (2015.04)

(58) Field of Classification Search
CPC ...... A01G 23/00; A01G 23/08; A01G 23/091; B27L 35/10; B27B 11/12; B60R 2011/004; B60R 2011/005; B60R 2011/0052; B60R 2011/0059; B60R 2011/0061; B60R 2011/008; B60R 2011/0082; B60R 2011/0084; B60R 2011/0085; B60R 2011/0087; B60R 2011/0089; B60R 2011/0091; B60R 2011/0092
USPC .......... 37/302; 224/523, 521, 485; 296/26.1, 296/26.09
See application file for complete search history.

(56) References Cited

U.S. PATENT DOCUMENTS

| | | | |
|---|---|---|---|
| 3,033,253 A | 5/1962 | Purdy | |
| 3,804,138 A | 4/1974 | Adcock | |
| 3,809,135 A | 5/1974 | Dove | |
| 4,164,247 A | 8/1979 | Wolf | |
| 5,950,699 A | 9/1999 | Dove | |
| 6,439,279 B1 | 8/2002 | Underwood | |
| 6,901,978 B2 | 6/2005 | Simpson | |
| 7,152,640 B1 * | 12/2006 | Williams | A01G 23/091 144/34.1 |
| 7,610,698 B2 | 11/2009 | May | |
| 8,505,973 B2 * | 8/2013 | Hill | B62D 49/04 172/272 |

(Continued)

OTHER PUBLICATIONS

Search Report dated Jun. 12, 2015 from related British Patent Application No. GB1422671.6; 4 pages.

*Primary Examiner* — Matthew G Katcoff
(74) *Attorney, Agent, or Firm* — Hovey Williams LLP (57) ABSTRACT

A saw attachment for a vehicle. The saw attachment includes a wedge-shaped saw blade with teeth extending along sides of the saw blade. The saw attachment also includes a guard secured to the saw blade and extending in a non-coplanar direction from the saw blade. The saw attachment further includes a mounting assembly comprising a longitudinally-extending frame having first and second ends, with the first end pivotably secured to the saw blade, and a mounting plate pivotably secured to the second end of the frame, such that the mounting plate is operable to be removably secured to the vehicle. The saw attachment further includes an adjustable linkage connected to the mounting assembly and the guard, with the adjustable linkage being operable to selectively extend or retract so as to allow the saw blade to decline and incline, respectively.

18 Claims, 8 Drawing Sheets

(56) References Cited

U.S. PATENT DOCUMENTS

2010/0164202 A1 7/2010 Dilworth et al.
2013/0146724 A1 6/2013 Werthauser

* cited by examiner

TREE SAW ATTACHMENT FOR SMALL VEHICLE

RELATED APPLICATIONS

This non-provisional patent application claims priority to U.S. Provisional Patent Application Ser. No. 61/919,222 filed on Dec. 20, 2013 and entitled "TREE SAW ATTACHMENT FOR SMALL VEHICLE," and U.S. Provisional Patent Application Ser. No. 62/016,870 filed on Jun. 25, 2014 and entitled "TREE SAW ATTACHMENT FOR SMALL VEHICLE." The above-identified provisional patent applications are herein incorporated by reference in their entireties into this non-provisional patent application.

FIELD

The present invention relates to a saw attachment for small vehicles. In more detail, the present invention is directed to a tree and/or brush saw attachment configured for removable attachment to small vehicles, such as all-terrain vehicles, lawn tractors, four-wheelers, or the like.

RELATED ART

It is well known to provide large vehicles and/or heavy-equipment machines (e.g., front-end loaders and bulldozers) with a removable saw attachment for cutting vegetation, such as brush and trees. See, e.g., U.S. Pat. Nos. 3,809,135 and 5,950,699, which are herein incorporated by reference in their entireties. However, such saw attachments have only been configured for use with large, expensive heavy-equipment vehicles, such as bulldozers, front-end loaders, and tractors. As such, individuals who own and operate smaller work vehicles, such as all-terrain vehicles, four-wheelers, lawn tractors, or the like, have been unable to use such saw attachments for clearing and removing vegetation, such as trees and brush.

Furthermore, previously-used saw attachments were generally only capable of being attached to a single, specific type of vehicle. As such, if a vehicle on which a saw attachment was being used was inoperable, a user would be unable to use the saw attachment on a different vehicle. Additionally, if the user obtained a new vehicle or simply wanted to use a different vehicle, the user could not use previously-used saw attachments because the saw attachments were generally not configured for use with the new or different vehicles.

As such, there exists a need for a saw attachment that is configured to be removably attached to small, work vehicles, such as all-terrain vehicles, four-wheelers, lawn tractors, and the like. Furthermore, there is a need for a saw attachment that is operable to be attached and used with a plurality of different types of small, work vehicles.

SUMMARY

Embodiments of the present invention include a saw attachment for a vehicle. The saw attachment includes a wedge-shaped saw blade including a base edge and first and second side edges, with the saw blade including teeth formed along at least a portion of the first and second side edges. The saw attachment additionally includes a guard secured to the saw blade and extending in a non-coplanar direction from the saw blade. The saw attachment further includes a mounting assembly comprising a longitudinally-extending frame having first and second ends, with a first end pivotably secured to the saw blade, and a mounting plate pivotably secured to the second end of the frame, such that the mounting plate is operable to be removably secured to the vehicle. The saw attachment further includes an adjustable linkage connected to the mounting assembly and the guard, with the adjustable linkage being operable to selectively extend or retract so as to decline and incline, respectively, the saw blade.

An additional embodiment of the present invention includes a saw attachment for a small vehicle. The saw attachment comprises a wedge-shaped saw blade, a guard secured adjacent to a base of the saw blade and extending generally perpendicularly from said saw blade, and a mounting assembly. The mounting assembly comprises a longitudinally extending frame having first and second ends, with the first end pivotably secured to the base of said saw blade, and a mounting plate pivotably secured to the second end of the frame, and with the mounting plate operable to be removably secured to the small vehicle. The mounting plate includes a plurality of groove-like openings formed therethrough. Such groove-like openings are configured to receive a portion of a fastener for securing said saw attachment to the small vehicle.

Embodiments of the present invention also include a method for using a small vehicle for cutting vegetation. The method comprises the initial step of attaching a saw attachment to the small vehicle, with the saw attachment including a wedge-shaped saw blade having base and an apex, and also including a mounting assembly. The mounting assembly further comprises a longitudinally extending frame having first and second ends, with the first end pivotably secured to the base of the saw blade, and a mounting plate pivotably secured to the second end of the frame, and with the mounting plate operable to be removably secured to the small vehicle. A next step in the method includes positioning, via the small vehicle, an edge of the saw blade adjacent to the vegetation to be cut. A further step of the method includes moving the small vehicle forward such that the edge of the saw blade traverses the vegetation to be cut.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWINGS

Embodiments of the present invention are described in detail below with reference to the attached drawing figures, wherein:

FIG. 5b is an exploded view of teeth of a saw blade of the saw attachment from FIG. 5a;

The drawing figures do not limit the present invention to the specific embodiments disclosed and described herein. The drawings are not necessarily to scale, emphasis instead being placed upon clearly illustrating the principles of the invention.

DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
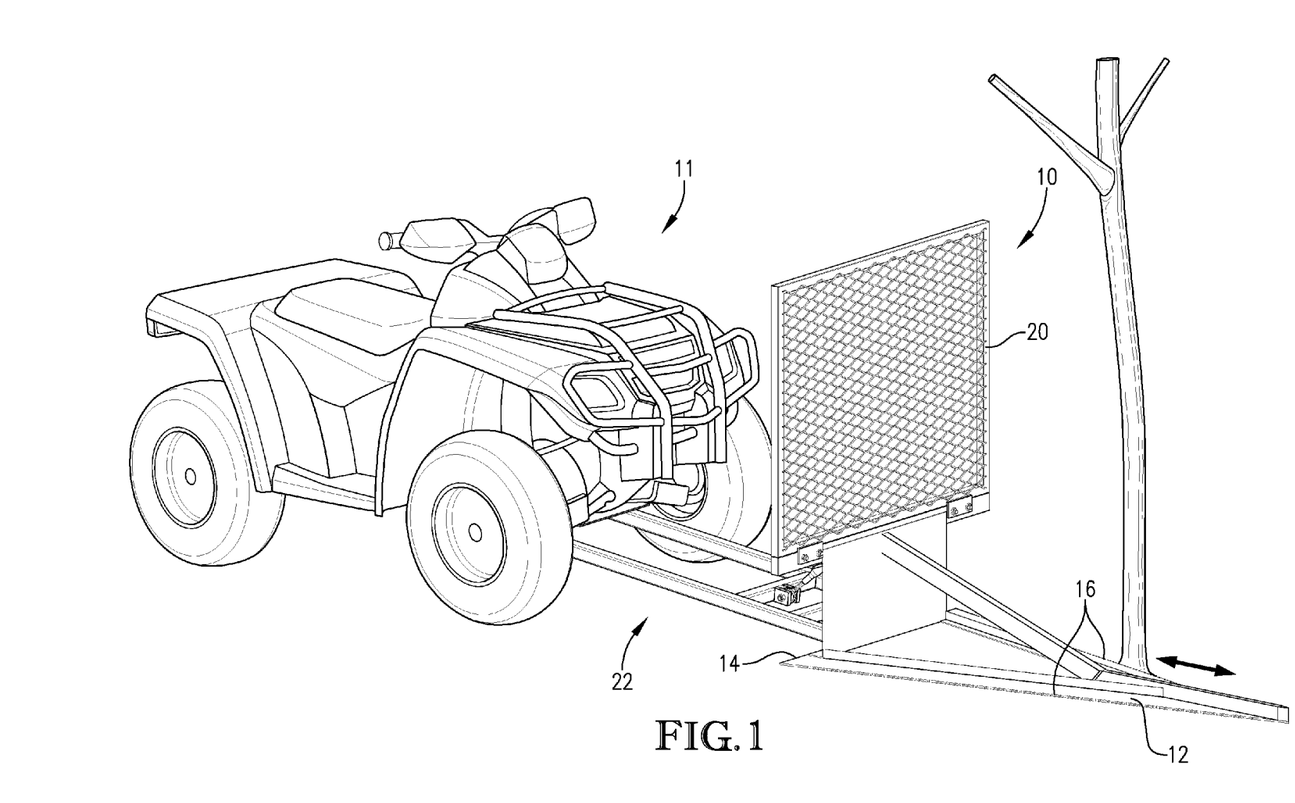
FIG. 1 is a perspective view of a saw attachment of the present invention secured to a small vehicle, with the saw attachment being illustrated cutting vegetation.

Referring to the drawings, reference numeral 10 of FIGS. 1-10 illustrates a saw attachment for a small vehicle 11. As shown in FIG. 1, the small vehicle 11 may include a four-wheeler-type vehicle. However, it is understood that the saw attachment 10 can be used with other types of small vehicles, such as all-terrain vehicles, lawn tractors, or the like. In more detail and with reference to FIGS. 1-4, the saw attachment 10 broadly comprises a wedge-shaped saw blade 12 including a base edge 14 and two side edges 16, with the saw blade 12 including a plurality of teeth 18 (See FIGS. 5a and 5b for more detail) extending outward from the side edges 16 of the saw blade 12. The saw attachment 10 further comprises a brush guard 20 attached to the saw blade 12 adjacent to the base edge 14 of the saw blade 12 and extending generally perpendicularly with respect to the saw blade 12. The saw attachment 10 further comprises a mounting bracket assembly 22 including first and second ends 24, 26 (See FIG. 6), with the mounting bracket assembly 22 configured to be pivotably attached, at the first end 24, to the saw blade 12 adjacent to the base edge 14 of the saw blade 12, and further being configured to be removably mounted, at the second end 26, to the small vehicle 11. As such, the saw attachment 10 is operable to be removable mounted to the small vehicle 11, such that an operator of the small vehicle 11 is capable of using the vehicle 11 and its mounted saw attachment 10 to cut vegetation, such as trees, brush, or the like (See, e.g., FIG. 1).

Figure 2:
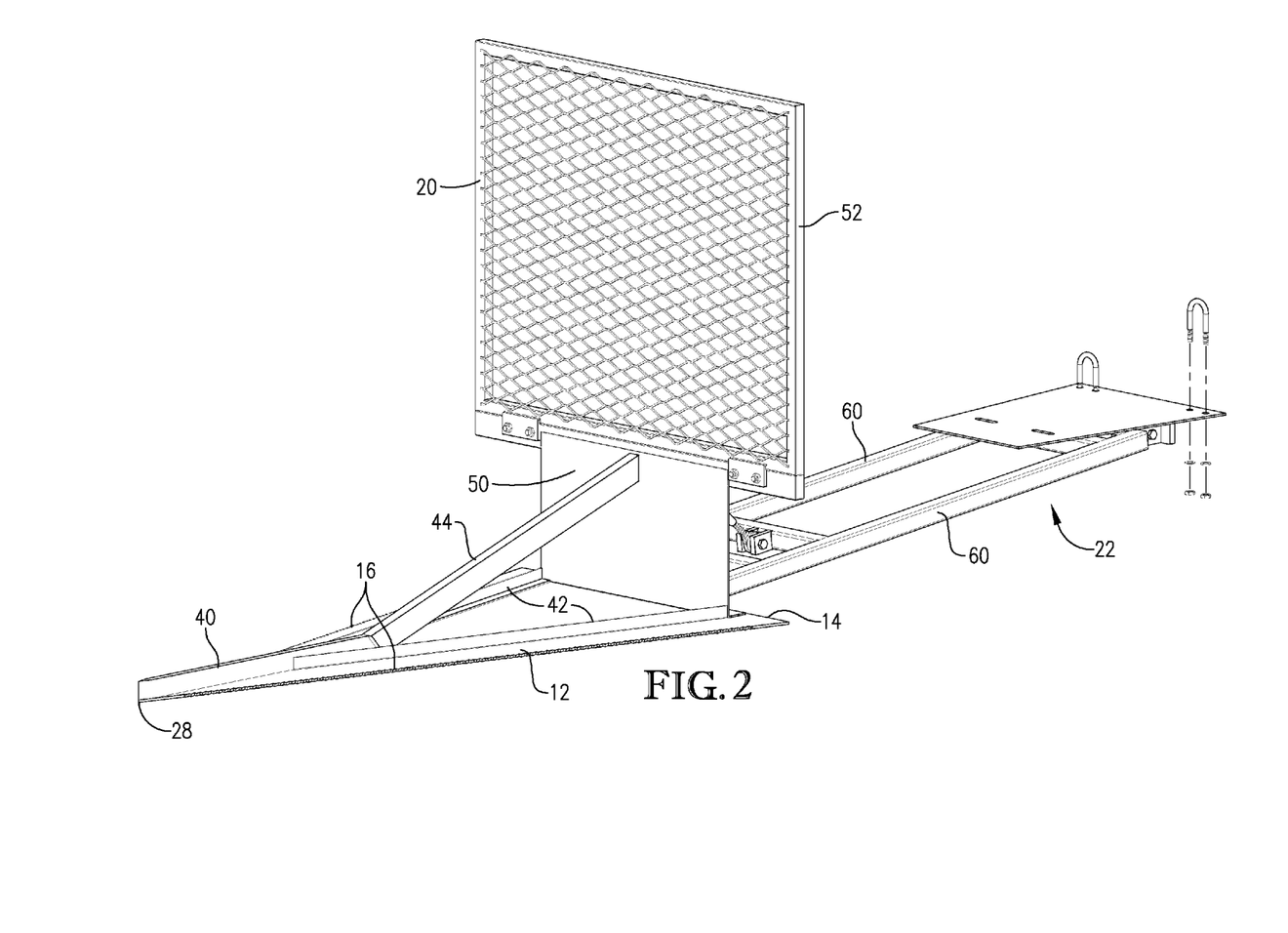
FIG. 2 is a top front perspective view of the saw attachment from FIG. 1.
Figure 3:
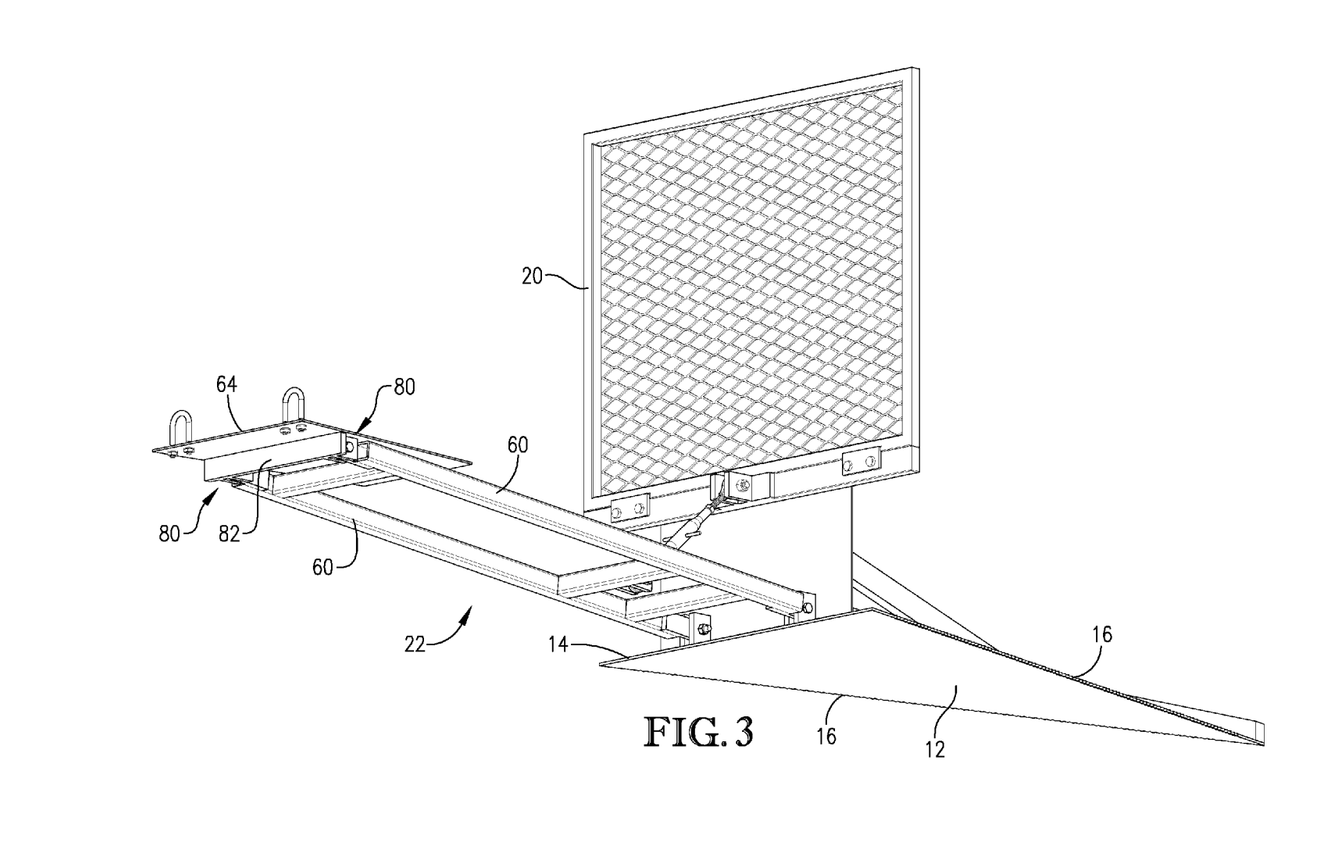
FIG. 3 is a bottom rear perspective view of the saw attachment from FIGS. 1-2.
Figure 4:
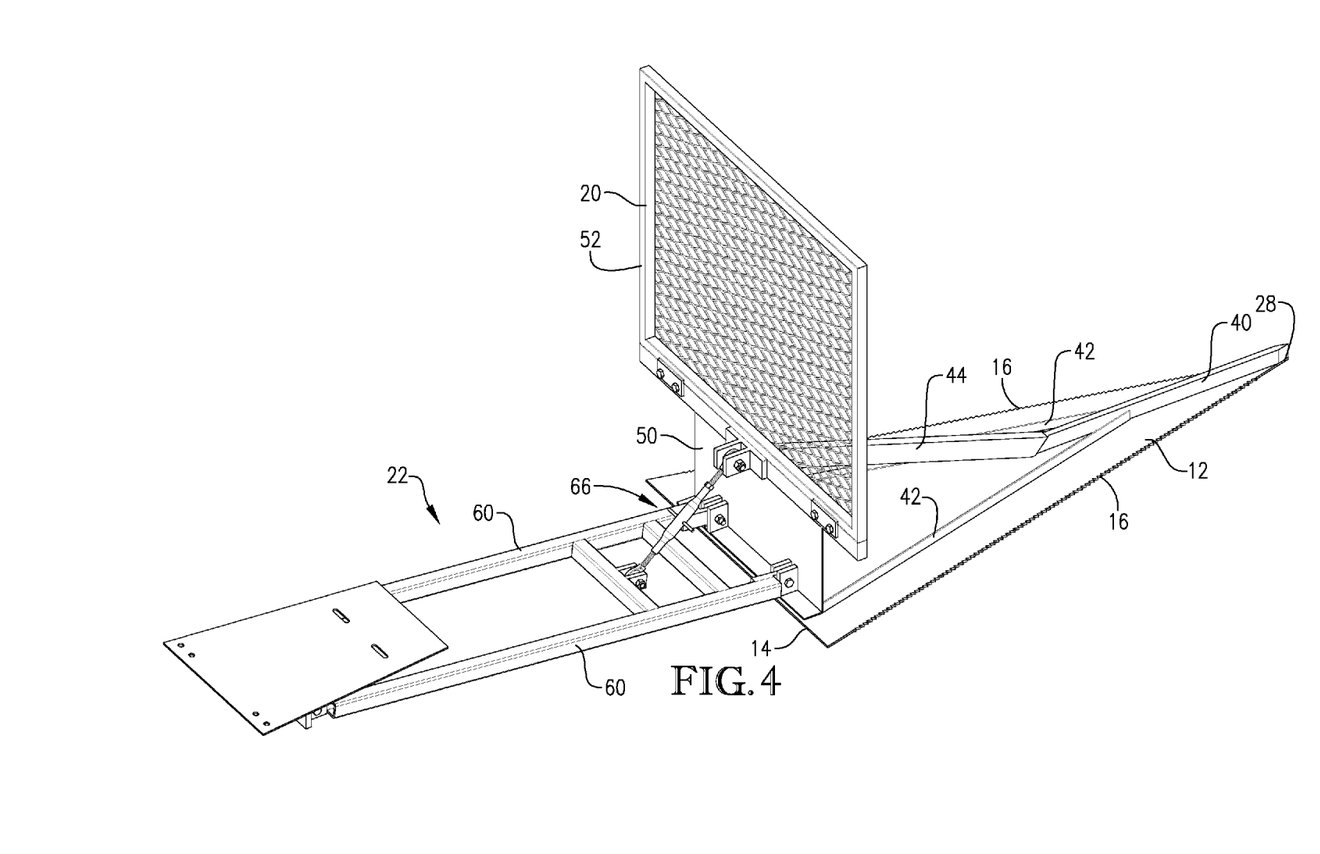
FIG. 4 is a top rear perspective view of the saw attachment from FIGS. 1-3.

In more detail and with reference to FIGS. 2-4, the saw blade 12 may be generally planar and formed from a strong, hard, and abrasion-resistant material, such as high-quality steel, AR 400, and/or AR 500. As previously described, the saw blade 12 can be generally wedge-shaped, having the base edge 14 and the two side edges 16 that extend from the base edge 14 to meet at an apex 28. In some embodiments, the apex 28 will be formed with an angle, as measured between each of the side edges 16, of between 20 to 80 degrees, between 30 to 50 degrees, between 35 to 45 degrees, or about 40 degrees. As mentioned above, the saw attachment 10 can be used on various types of small vehicles 11. In some embodiments, the saw blade 12 will have a length (as measured from the base edge 14 to the apex 28) of between approximately 50-200%, 75-150%, or 90-125% of a length of the small vehicle 11. Additionally, the saw blade 12 may have a width (i.e., a length of the base edge 14) of between approximately 50-150%, 75-125%, or 85-115% of a width of the small vehicle 11.

Figure 5A:
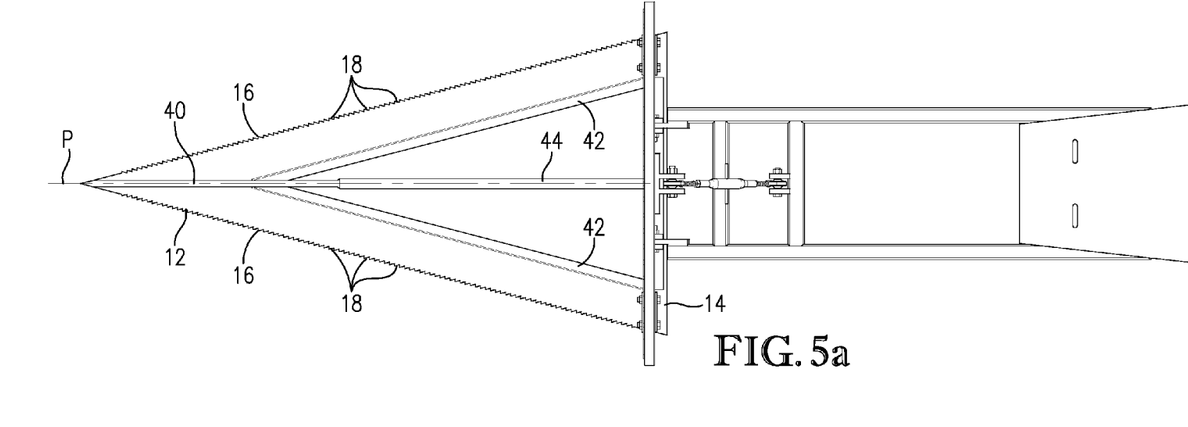
FIG. 5a is a top plan view of the saw attachment from FIGS. 1-4.
Figure 5B:
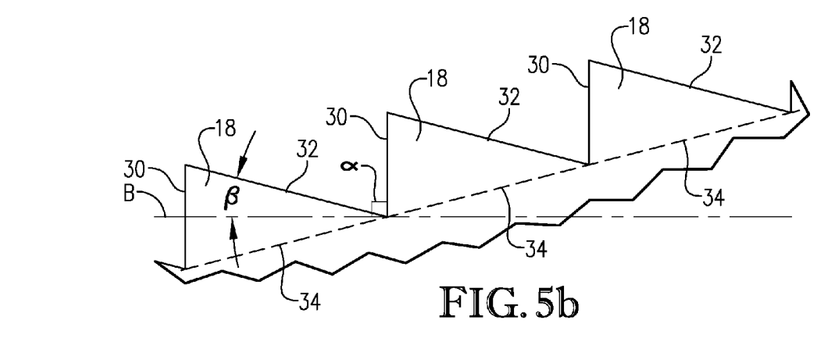

With reference to FIGS. 5a and 5b, the teeth 18 of the saw blade 12 can extend along both of the side edges 16 of the saw blade 12. In some embodiments, each of the teeth 18 is formed in a triangular-shape, with each tooth 18 including first and second sides 30, 32 separated by a base 34. It is understood that the base 34 is not a structural edge of the tooth 18, but is simply presented as an illustrative line separating end portions of the first and second sides 30, 32 of each tooth 18. In some embodiments, as shown in FIG. 5b, the first side 30 of each of the teeth 18 will form an angle α of between 70 degrees to 110 degrees, between 80 degrees to 100 degrees, or about 90 degrees with respect to an illustrative line B. It is understood that the illustrative line B is parallel with a longitudinal centerline P bisecting the saw blade 12 (See, e.g., FIG. 5a). Furthermore, in some embodiments, the second side 32 of each of the teeth 18 will form an angle β of between 20 degrees to 70 degrees, between 30 degrees to 60 degrees, between 40 degrees to 50 degrees, or about 45 degrees with respect to the line B of the saw blade 12. In certain embodiments, the bases 34 of each of the teeth 18 may have a width of between 1/32 inch to 1/2 inch, between 1/16 inch to 1/4 inch, or about 1/8 inch. In other embodiments, the first and second sides 30, 32 of each of the teeth 18 may have lengths of between 1/32 inch to 1/2 inch, between 1/16 inch to 1/4 inch, or about 1/8 inch.

In some embodiments, the saw attachment 10 will include various support structure components for enhancing the strength and durability of the saw blade 12. For example and as illustrated in FIGS. 2, 4, 5a, and 7, the saw blade 12 may include a primary support bar 40 attached to a top surface of the saw blade 12 and extending down at least a portion of the saw blade's 12 longitudinal centerline P (See, e.g., FIG. 5a). The primary support bar 40 may be formed from a high-strength material, such as iron, steel, or the like. In some embodiments, the primary support bar 40 will extend from a first end located adjacent to the apex 28 of the saw blade 12 to a second end located adjacent to a midpoint of the length of the saw blade 12. In other embodiments, the primary support bar 40 may extend further or less than the midpoint of the saw blade 12. In some embodiments, the first end of the primary support bar 40 may be formed and/or sharpened to form an angle that corresponds with the angle of the apex 28 of the saw blade 12. The primary support bar 40 may be secured to the top surface of the saw blade 12 via various means of attachment, such as by welding, riveting, bolting, or the like.

In additional embodiments, the saw blade 12 may include one or more secondary support bars 42. The secondary support bars 42 may be formed from a high-strength material, such as iron, steel, or the like. In some embodiments, one or more of the secondary support bars 42 may extend along the upper surface of the saw blade 12 from the primary support bar 40 to the brush guard 20. In such embodiments, the secondary support bars 42 may be secured to each of the primary support bar 40, the upper surface of the saw blade 12, and the brush guard 20 via various methods of attachment, such as by welding, riveting, bolting, or the like.

In further embodiments, the saw blade 12 may include a support strut 44 that extends from the primary support bar 40 at an incline, away from the upper surface of the saw blade 12, and to the brush guard 20. The support strut 44 may be formed from a high-strength material, such as iron, steel, or the like. In some embodiments, the support strut 44 may extend away from the upper surface of the saw blade 12 at an angle of between 10 degrees to 50 degrees, between 20 degrees to 40 degrees, or about 30 degrees. As such, the support strut 44 extends to the brush guard 20 at a distance above the saw blade 12, with such distance dependent on a length of the support strut 44 and the angle presented between support strut 44 with respect to the upper surface of the saw blade 12. In some embodiments, the support strut 44 may be secured to each of the primary support bar 40 and the brush guard 20 via various methods of attachment, such as by welding, riveting bolting, or the like.

Figure 7:
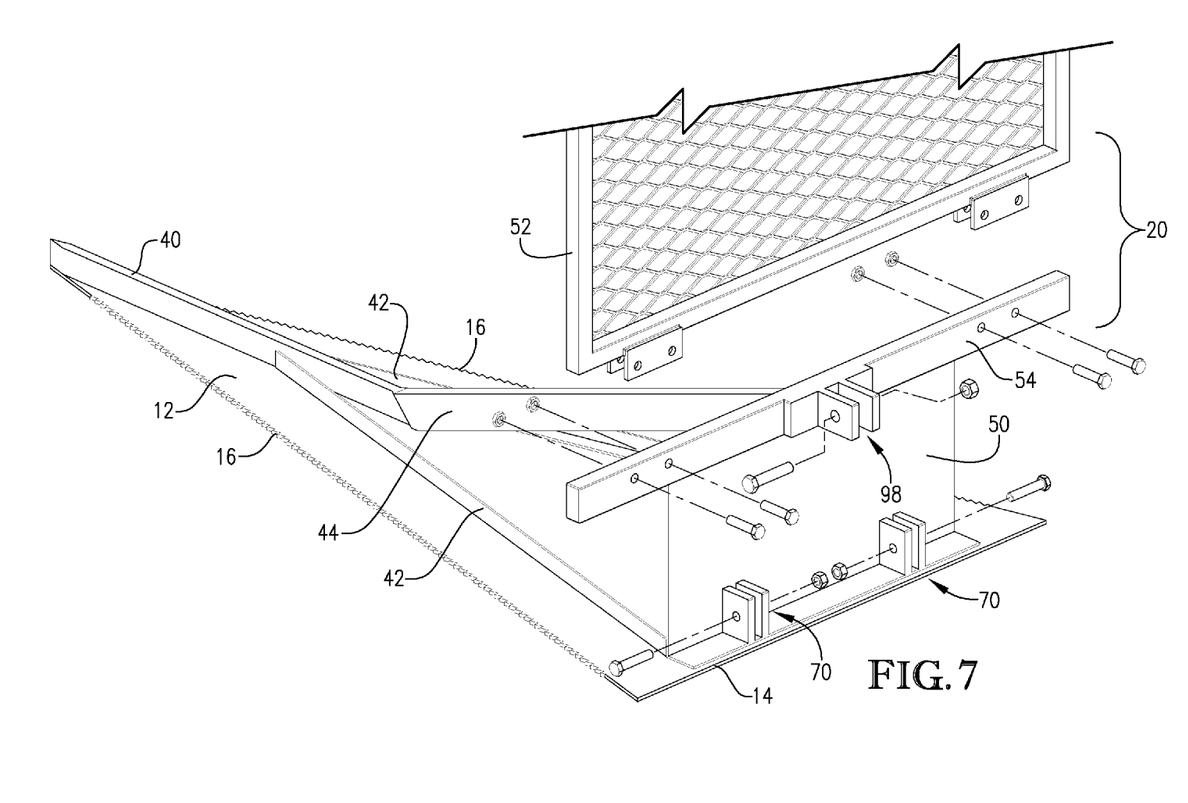
FIG. 7 is a rear partial view of a saw blade and a guard of the saw attachment from FIGS. 1-4.

Turning to the brush guard 20 of embodiments of the present invention, as perhaps best illustrated by FIGS. 2, 4, and 7, the brush guard 20 may comprise a rectangular piece of material extending generally perpendicularly from the upper surface of the saw blade 12. In some embodiments, the brush guard 20 may extend from the saw blade 12 at an angle of between 70 degrees to 110 degrees, between 80 degrees to 100 degrees, or about 90 degrees (i.e., generally perpendicularly) with respect to the saw blade 12. In some embodiments, the brush guard 20 may comprise a solid piece of high-strength material, such as steel, iron, or the like. Alternatively, as shown in the figures, the brush guard 20 may include portions formed from a screen or grating-like material. In some embodiments, the brush guard 20 may be formed from a plurality of interconnected, individual pieces. For instance, and with reference to FIGS. 2, 4, and 7, the brush guard 20 may comprise a first rectangular portion 50 that extends upward from a position adjacent to the base edge 14 of the saw blade 12. In some embodiments, the first rectangular portion 50 may comprise a generally solid section of material.

The brush guard 20 may additionally comprise a second rectangular portion 52 extending upward from the first rectangular portion 50. In some embodiments, the second rectangular portion 52 may generally comprise a rectangular frame bounding a screen or grating-like material. In other embodiments, the second rectangular portion 52 may simply comprise a solid piece of material. Although the first and second rectangular portions 50, 52 are described as rectangular, embodiments of the present invention contemplate the portions of the brush guard 20 having other shapes, such as oval, circular, or irregular-shaped. The first and second rectangular portions 50, 52 may be secured together via various methods of securement, such as by welding, riveting, bolting, or the like. In some embodiments, the brush guard 20 may include a connector portion 54 (See FIG. 7) between the first and second rectangular portions 50, 52. The first and second rectangular portions 50, 52 may be connected together, via the connector portion 54, by way of welding, riveting, bolting, or the like. For instance, the second rectangular portion 52 may include one or more pairs of parallel flange members extending downward and configured to be received about the connector portion 54. The parallel flange members and the connector portion 54 may include holes, such that fasteners may be inserted therethrough, to secure the first and second rectangular portions 50, 52 together.

In certain embodiments, the brush guard 20 can have a height between approximately 75-200%, 90-175%, or 110-150% of the height of the small vehicle 11 to which the saw attachment 10 is attached. Additionally, the brush guard 20 may include a width between approximately 50-150%, 75-125%, or 85-115% of the width of the small vehicle 11.

Figure 6:
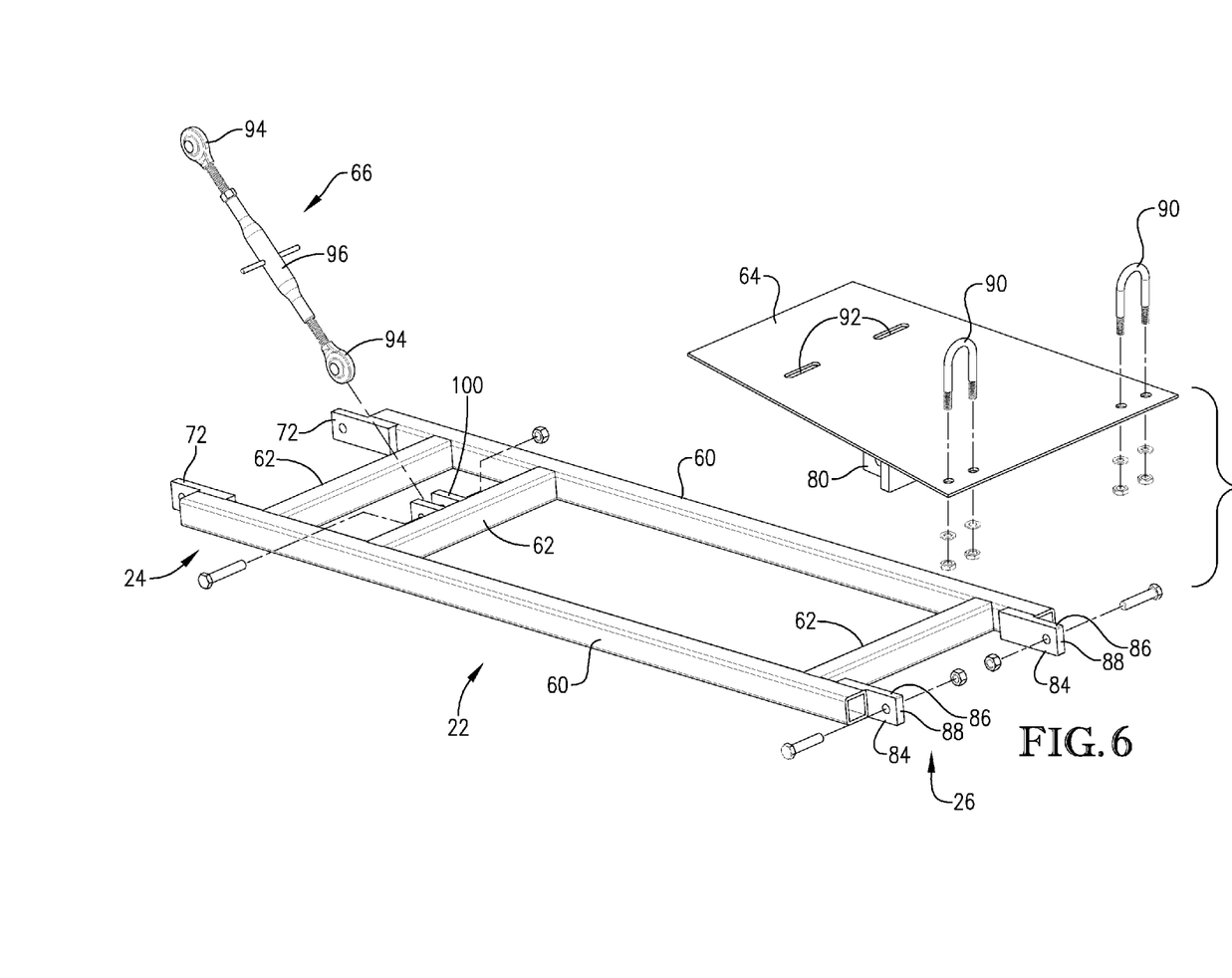
FIG. 6 is an exploded view of a mounting bracket from the saw attachment from FIGS. 1-4.

With particular reference to FIG. 6, the mounting bracket assembly 22 broadly includes two longitudinal side sections 60 having first and second ends (corresponding with the first and second ends 24, 26 of the mounting bracket assembly 22), with the side sections 60 extending generally parallel with respect to each other. The mounting bracket assembly 22 may additionally comprise two or more lateral support sections 62 that extend between each of the side sections 60. The mounting bracket assembly 22 may additionally include a mounting plate 64 secured to the side sections 60 generally adjacent to the second ends of the side sections 60. Furthermore, the mounting bracket assembly 22 may include an adjustable linkage 66 extending from one of the lateral support sections 62 and operable to be removably secured to the brush guard 20. The mounting bracket assembly 22 may, in some embodiments, extend generally in planar alignment with the saw blade 12. For example, with reference to FIG. 2, the mounting bracket assembly 22 and the saw blade 12 may be offset from planar alignment no more than between about 1 to 40 degrees, 10 to 30 degrees, or about 20 degrees.

In operation, the first end 24 of the mounting bracket assembly 22 can be pivotably secured to the saw blade 12, via various types of inter-engaging mounting components. For instance, and with reference to FIG. 7, the saw blade 12 may include two pairs of set apart receiving mount components 70 with circular openings formed therethrough. Such receiving mount components 70 may be secured the saw blade 12 adjacent to the base edge 14 by welding, riveting, bolting, or the like. In some embodiments, the receiving mount components 70 may alternatively, or simultaneously, be secured to the brush guard 20. Furthermore, and with reference to FIG. 6, the first ends of each of the side sections 60 of the mounting bracket assembly 22 may include a corresponding inserting mount component 72 with a circular opening formed therethrough and operable to fit between one of the set apart pairs of receiving mount components 70 on the saw blade 12. Such inserting mount components 72 may be secured to the side sections 60 by welding, riveting, bolting, or the like. With each of the inserting mount components 72 inserted within a pair of receiving mount components 70, a bolt and/or pin can be inserted through the aligned circular openings, such that the mounting bracket assembly 72 is operable to rotate about the bolt or pin. In some embodiments, a securing component, such as a nut, may be positioned on an end of the bolt or pin so as to secure the bolt or pin in place.

Similarly, the second end of the mounting bracket assembly 22 may be pivotably secured to the mounting plate 64 via inter-engaging mounting components. In particular, and with reference to FIG. 3, a bottom surface of the mounting plate 64 may include two pairs of set apart receiving mount components 80 with circular openings formed therethrough. Such receiving mount components 80 may be secured to the mounting plate 64 by welding, riveting, bolting, or the like. In some embodiments the receiving mount components 80 may be interconnected via a mounting bar 82. Further, and with reference to FIG. 6, the second ends of each of the side sections 60 may include a corresponding inserting mount components 84 with a circular opening formed therethrough and operable to fit between one of the set apart pairs of receiving mount components 80 on the mounting plate 64. Such inserting mount components 84 may be secured to the side sections 60 by welding, riveting, bolting, or the like. With each of the inserting mount components 84 inserted within a pair of receiving mount components 80, a bolt or pin can be inserted through the aligned circular openings, such that the side sections 60 are operable to at least partially rotate about the bolt or pin. In some embodiments, a securing component such as a nut may be positioned on an end of the bolt or pin so as to secure the bolt or pin in place.

In certain embodiments, it may be preferable to at least partially restrict the side sections 60 from rotating with respect to the mounting plate 64. As such, the inserting mount components 84 may be configured to abut portions of the mounting plate 64 and/or the mounting bar 82. For instance, and with reference to FIG. 6, a top surface 86 of the inserting mount components 84 may be configured to abut a bottom surface of the mounting plate 64 if the side sections 60 have rotated too far with respect to the mounting plate 64. Additionally, a rear surface 88 of the inserting mount components 84 may be configured to abut an interior surface of the mounting bar 82 if the side sections 60 have rotated too far with respect to the mounting plate 64. As such, the side sections 60 can be at least partially restricted from rotating with respect to the mounting plate 64.

Remaining with FIG. 6, the mounting plate 64 may generally comprise a planar, quadrilateral-shaped piece of material with one or more openings formed therethrough. In some embodiments, such as illustrated in the figures, the mounting plate 64 may be formed as an isosceles trapezoid. Although, in other embodiments, the mounting plate 64 may be square, rectangular, oval, circular, or an other shape necessary to facilitate securement of the mounting plate to an underside of the small vehicle 11. The mounting plate 64 may be formed from high-strength material, such as steel, iron, or the like.

The one or more openings on the mounting plate 64 are operable to accept bolts, pins, U-bolts, or other fastener components operable to secure the mounting plate to an underside of the small vehicle 11. For example, in some embodiments, the mounting plate 64 may be removably secured to the small vehicle 11 via a plurality of U-bolts 90. In particular, the U-bolts 90 can be positioned about various frame support components (e.g., frame/sub-frame components, struts, mounting brackets or the like) of the small vehicle 11. Once the U-bolts 90 are securely positioned about a portion of the small vehicle 11, threaded legs of the U-bolts 90 can be inserted through the openings in the mounting plate 64. Finally, washer/nut combinations may be applied to each of the threaded legs of the U-bolts 90 so as to secure the mounting plate 64 to the small vehicle 11 via the U-bolts 90.

In some embodiments, one or more of the openings on the mounting plate 64 may comprise groove-like, longitudinally-extending openings 92. Such groove-like openings 92 allow the U-bolts 90 to be positioned at any position along such openings' 92 lengths. As a result, the mounting plate 64 can be secured to various styles and/or types of small vehicles, each having differently-positioned frame support components. For example, U-bolts 90 may be positioned adjacent to a right-most side of one or more of the groove-like openings 92 when the mounting plate 64 is secured to a small vehicle of a first type. Alternatively, U-bolts 90 may be positioned adjacent to a left-most side of the one or more of the groove-like openings 92 when the mounting plate 64 is secured to a small vehicle of a second type. Such positioning differences may be required, for instance, if the first and second vehicles have frame support components that are positioned at different locations on the respective vehicles.

With reference to FIGS. 4 and 6-7, the adjustable linkage 66 is configured to be removably attached to each of the mounting bracket assembly 22 and the brush guard 20. In more detail, as perhaps best shown by FIG. 6, the adjustable linkage 66 may comprise a turnbuckle having eyebolts 94 on each of first and second ends opposing an adjustable central section 96. The eyebolts 94 may be threadedly received on the central section 96, such that a rotation of the central section 96 causes a selective extension or retraction of the eyebolts 94 with respect to the central section 96. As such, an overall length of the adjustable linkage 66 can be altered.

In more detail, the eyebolt 94 on the first end of the adjustable linkage 66 may be positioned within a pair of set apart receiving mount components 98 attached to a rear side of the brush guard 20 (See FIG. 7). The receiving mount components 98 will include circular openings formed therethrough, such that that a pin, bolt, or the like, can be inserted through the circular openings and the eyebolt 94 of the adjustable linkage 66 to secure the adjustable linkage 66 to the brush guard 20. In some embodiments, a securing component such as a nut may be positioned on an end of the bolt or pin so as to secure the bolt or pin in place. Similarly, the eyebolt 94 on the second end of the adjustable linkage 66 may be positioned within a pair of set apart receiving mount components 100 attached to one of the support components 62 of the mounting bracket assembly 22 (See FIG. 6). The receiving mount components 100 will include circular openings formed therethrough, such that that a pin, bolt, or the like, can be inserted through the circular openings and the eyebolt 94 of the adjustable linkage 66 to secure the adjustable linkage 66 to the mounting bracket assembly 22. In some embodiments, a securing component such as a nut may be positioned on an end of the bolt or pin so as to secure the bolt or pin in place. With the adjustable linkage 66 secured to each of the brush guard 20 and the mounting bracket assembly 22, the adjustable central section 96 of the adjustable linkage 66 can be rotated about the eyebolts so as to selectively extend or retract an overall length of the adjustable linkage 66.

Figure 8:
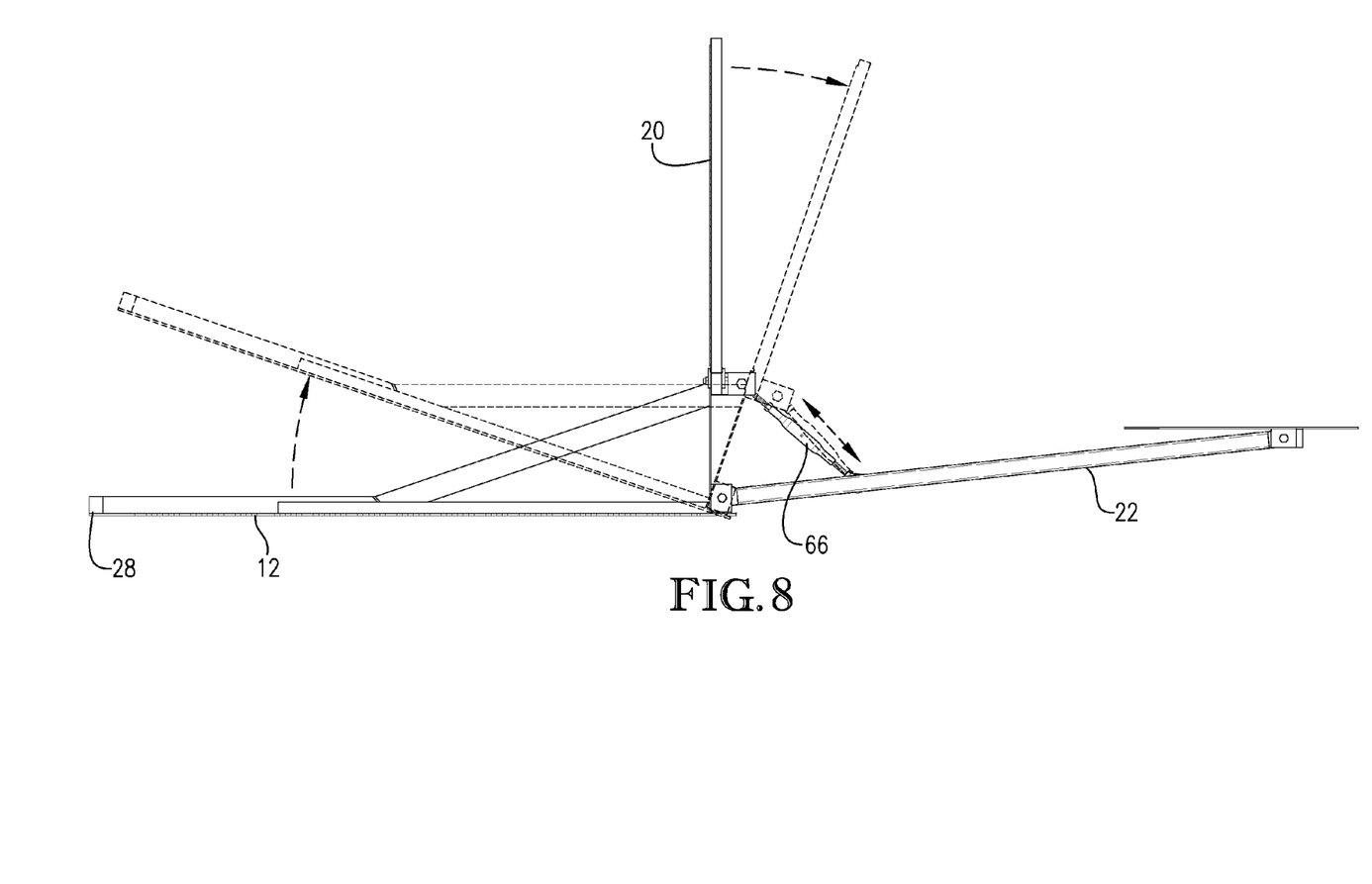
FIG. 8 is an illustration of the saw attachment from FIGS. 1-4 being shown orientated at multiple inclinations.

In operation, the saw attachment 10 is attached to the small vehicle 11 by a method that includes the initial step of securing the mounting bracket assembly 22 to the underside of the small vehicle 11. In particular, the mounting plate 64 will be secured to the frame support components of the small vehicle 11 via the U-bolts 94 as was previously described. A next step includes securing the mounting bracket assembly 22 to the saw blade 12. As previously described, the receiving mount components 72 can be inserted between the receiving mount components 70 to secure the mounting bracket assembly 22 to the saw blade 12. A next step includes securing the adjustable linkage 66 to each of the mounting bracket assembly 22 and to the brush guard 20. In particular, one of the eyebolts 94 of the linking member can be received within each of the receiving mount component 98 of the brush guard 20 and the receiving mount component 100 of the mounting bracket assembly 22. A final step may include adjusting an operating angle of the saw blade 12 by modifying the length of the adjustable linkage 66. As to the final step, the length of the adjustable linkage 66 can be modified by rotating the central section 96 of the adjustable linkage 66 so as to extend or retract the eyebolts 94 from within the central section, thereby extending or reducing the overall length of the adjustable linkage 66. As illustrated by FIG. 8, by reducing the length of the adjustable linkage 66, the apex 28 of the saw blade 12 is caused to rise, such that the saw blade 12 inclines with respect to a ground plane. Alternatively, by increasing the length of the adjustable linkage 66, the apex 28 of the saw blade 12 is caused to lower, such that the saw blade 12 declines with respect to a ground plane. In some embodiments, it may be preferable to position the saw blade 12 at an inclination of no more than 5 degrees, 10 degrees, 25 degrees, or 35 degrees with respect to the ground plane when using the saw attachment 10 to cut vegetation. Advantageously, embodiments of the present invention provide for the saw blade 12 to be positioned at various inclinations without requiring the saw attachment 10 to be removed from the small vehicle 11.

With the saw attachment 10 properly attached to the small vehicle 11, as shown in FIG. 1, the saw attachment 10 can be used to cut trees, brush, and/or other vegetation. In operation, the apex 28 of the saw blade 12 can be positioned at a point to the side of a target tree or brush, such that the teeth 18 of the saw blade 12 are operable to begin cutting into the target tree or brush as the as the saw blade 12 is moved forward under power of the small vehicle 11. In some embodiments, the saw attachment 10 is capable of cutting vegetation (e.g., trees and/or brush) having a diameter of between 1 to 5 inches, between 2 to 4 inches, or about 4 inches with a single pass of the saw attachment 10. For larger vegetation, multiple passes of the saw attachment 10 may be required. For example, it may be necessary to make a first forward pass with the saw blade 12 cutting into a target tree by driving the small vehicle 11 in the forward direction. A next step may include reversing the small vehicle 11 and realigning the saw blade 12, so as to make a second forward pass. Furthermore, some embodiments provide for the saw blade 12 to cut vegetation while traveling in a reverse direction. As such, the saw attachment 10 may cut vegetation by alternating movement of the small vehicle 11 in the forward and reverse directions, so as to perform a back-and-forth sawing-action.

Although the invention has been described with reference to the preferred embodiment(s), it is noted that equivalents may be employed and substitutions made herein without departing from the scope of the invention.

The invention claimed is:

1. A saw attachment for a vehicle, said saw attachment comprising:
   a wedge-shaped saw blade having a base edge and first and second side edges, with the saw blade including teeth formed along at least a portion of the first and second side edges;
   a guard secured to said saw blade and extending in a non-coplanar direction from said saw blade;
   a mounting assembly comprising—
   (i) longitudinally extending frame having first and second ends, with the first end pivotably secured to said saw blade,
   wherein said frame comprises first and second side sections extending generally parallel with respect to each other, and wherein said frame further includes two or more lateral support sections extending between said first and second side sections, and
   (ii) a mounting plate pivotably secured to the second end of said frame, and wherein said mounting plate is operable to be removably secured to said vehicle, wherein said mounting assembly is configured to extend underneath the vehicle and to be removably secured to an underside of the vehicle; and
   an adjustable linkage connected to each of said mounting assembly and said guard, wherein said adjustable linkage is connected to one of said lateral support sections of said frame of said mounting assembly,
   wherein said adjustable linkage is operable to selectively extend or retract so as to decline or incline, respectively, said saw blade with respect to said mounting assembly.

2. A saw attachment according to claim 1, wherein said mounting assembly extends generally in planar alignment with said saw blade, such that the alignment between said mounting assembly and said saw blade is between 1 to 30 degrees.

3. A saw attachment according to claim 1, wherein each of said teeth of said saw blade are formed in a shape of a triangle having a base and first and second sides, wherein the first side of each of the teeth forms an angle of between 80-100 degrees with respect to a longitudinal centerline of said saw blade, and wherein the second side of each of the teeth forms an angle between 40-50 degrees with respect to the longitudinal centerline of said saw blade.

4. A saw attachment according to claim 1, wherein said saw blade includes a primary support bar on an upper surface of the saw blade and extending adjacent to at least a portion of a longitudinal centerline of said saw blade.

5. A saw attachment according to claim 4, wherein said saw blade includes one or more secondary support bars extending along an upper surface of said saw blade, and wherein said secondary support bars extend from said primary support bar to said guard.

6. A saw attachment according to claim 4, wherein said saw blade includes a support strut extending at an angle from a top surface of said saw blade, and wherein said support strut extends from said primary support bar to said guard.

7. A saw attachment according to claim 1, wherein said guard extends from said saw blade at a generally perpendicular angle with respect to said saw blade.

8. A saw attachment according to claim 1, wherein said guard comprises a rectangular section of grate material.

9. A saw attachment according to claim 1, wherein said guard comprises two or more sections of material, including a first section of solid material and a second section of screen or grate material.

10. A saw attachment according to claim 1, wherein said mounting plate has a quadrilateral shape and is operable to be secured to said vehicle via U-bolts extending through one or more extended groove openings located through said mounting plate.

11. A saw attachment according to claim 1, wherein said adjustable linkage is a turnbuckle.

12. A saw attachment for a small vehicle, said saw attachment comprising:
   a wedge-shaped saw blade;
   a guard secured adjacent to a base of said saw blade and extending generally perpendicularly from said saw blade; and
   a mounting assembly comprising—
   (i) a longitudinally extending frame having first and second ends, with the first end pivotably secured to the base of said saw blade, and
   (ii) a mounting plate pivotably secured to the second end of said frame, and wherein said mounting plate is operable to be removably secured to said small vehicle, wherein said mounting plate includes a rear portion that is wider than a front portion, and wherein said mounting plate includes a plurality of extended groove openings formed through the front portion of said mounting plate, wherein such extended groove openings are configured to receive a portion of a fastener for securing said saw attachment to the small vehicle.

13. A saw attachment according to claim 12, wherein said small vehicle is selected from: an all-terrain vehicle, a four-wheeler, or a lawn tractor.

14. A saw attachment according to claim 12, wherein each of the extended groove openings are configured to receive a fastener at various positions along the opening's length, such that the mounting plate is configured to secure the saw attachment to a plurality of different types of vehicles.

15. A saw attachment according to claim 12, wherein said saw blade has a length between 75-150% of a length of the small vehicle.

16. A saw attachment according to claim 12, wherein said guard has a height between approximately 90-175% of a height of the small vehicle.

17. A method for using a small vehicle for cutting vegetation, said method comprising the steps of:
(a) attaching a saw attachment to the small vehicle, with the saw attachment Including—
   (i) a wedge-shaped saw blade having a base and an apex, and
   (ii) a mounting assembly comprising—
      (A) a longitudinally extending frame having first and second ends, with the first end pivotably secured to the base of said saw blade and the second end attached to an underside of the small vehicle,
      (B) a mounting plate pivotably secured to the second end of said frame, and wherein said mounting plate is operable to be removably secured to the small vehicle,
      (C) an adjustable linkage connected to the frame and configured to adjust an inclination of the saw blade,
(b) positioning, via the small vehicle, an edge of the saw blade adjacent to the vegetation to be cut;
(c) moving the small vehicle forward such that the edge of the saw blade traverses the vegetation to be cut; and
(d) adjusting the adjustable linkage thereby adjusting the inclination of the saw blade with respect to a ground surface and to the mounting assembly, wherein said adjusting of step (d) is performed until the saw blade is orientated at an angle of less than or equal 10 degrees with respect to a ground surface.

18. The method according to claim 17, wherein said adjusting of step (d) is performed without detaching the saw attachment from the small vehicle.

\* \* \* \* \*